US012596181B2

(12) United States Patent
Tsadka

(10) Patent No.: US 12,596,181 B2
(45) Date of Patent: Apr. 7, 2026

(54) SCANNING LIDAR WITH OPTICAL SWITCHING

(71) Applicant: MAKALU OPTICS LTD., Yokneam Ilit (IL)

(72) Inventor: Sagie Tsadka, Yokneam Ilit (IL)

(73) Assignee: Makalu Optics Ltd., Yokneam Ilit (IL)

( * ) Notice: Subject to any disclaimer, the term of this patent is extended or adjusted under 35 U.S.C. 154(b) by 1080 days.

(21) Appl. No.: 17/613,325

(22) PCT Filed: May 20, 2020

(86) PCT No.: PCT/IB2020/054784
§ 371 (c)(1),
(2) Date: Nov. 22, 2021

(87) PCT Pub. No.: WO2020/234797
PCT Pub. Date: Nov. 26, 2020

(65) Prior Publication Data
US 2022/0229162 A1      Jul. 21, 2022

Related U.S. Application Data

(60) Provisional application No. 62/850,573, filed on May 21, 2019.

(51) Int. Cl.
*G01S 7/481* (2006.01)
*G01S 7/499* (2006.01)
*G01S 17/931* (2020.01)

(52) U.S. Cl.
CPC .......... *G01S 7/4817* (2013.01); *G01S 7/4813* (2013.01); *G01S 7/4814* (2013.01); *G01S 7/4816* (2013.01);
(Continued)

(58) Field of Classification Search
CPC .... G01S 7/4817; G01S 7/4814; G01S 7/4816; G01S 7/4818; G01S 7/499; G01S 17/42; G01S 7/48–51; G02B 6/35; G02F 1/313
See application file for complete search history.

(56) References Cited

U.S. PATENT DOCUMENTS 6,717,650 B2    4/2004   Jain
8,525,970 B2    9/2013   Zhao et al.
(Continued)

FOREIGN PATENT DOCUMENTS

CN          106371085 A      2/2017
CN          206132985 U   *  4/2017
(Continued)

OTHER PUBLICATIONS

Sungeun Jo, Hong Jin Kong, Hyochoong Bang, Jae-Wan Kim, Jomsool Kim, and Soungwoong Choi, "High resolution three-dimensional flash LIDAR system using a polarization modulating Pockels cell and a micro-polarizer CCD camera," Optics Express A1580, vol. 24, No. 26 | Dec. 2016.
(Continued)

*Primary Examiner* — Yuqing Xiao
*Assistant Examiner* — Chia-Ling Chen
(74) *Attorney, Agent, or Firm* — Brooks Kushman PC

(57) ABSTRACT

A scanning LiDAR with no moving parts includes a laser transmitter with a first magneto-optic switch delivering pulses to a first linear fiber array to a field of view (FOV), a receiver with optics directing reflected light to a second, orthogonal linear fiber array coupled to a second magneto-optic switch to deliver the light to a detector, and a controller to process detector signals and generate FOV data. A scanning method for improving resolution includes scanning along a first direction, directing light reflected from an object along a second direction orthogonal to the first direction to
(Continued)

form a received beam provided to a detector, processing detector signals to generate a pixel array, and varying an intensity profile within a pixel to move peak intensity in a continuous manner within the pixel by synchronously varying polarization of the transmitted and received light using associated Faraday rotators and phase masks.

28 Claims, 10 Drawing Sheets

(52) U.S. Cl.
CPC ............ *G01S 7/4818* (2013.01); *G01S 7/499* (2013.01); *G01S 17/931* (2020.01)

(56) References Cited

U.S. PATENT DOCUMENTS

| | | | | |
|---|---|---|---|---|
| 8,654,246 | B2 | 2/2014 | Kanamori | |
| 8,701,482 | B2 | 4/2014 | Tsadka et al. | |
| 9,841,495 | B2 | 12/2017 | Campbell et al. | |
| 10,126,412 | B2 | 11/2018 | Eldada et al. | |
| 10,393,877 | B2 | 8/2019 | Hall et al. | |
| 10,677,716 | B1 * | 6/2020 | Hart | G01H 9/00 |
| 2002/0171932 | A1 * | 11/2002 | Xiao | G02F 1/09 |
| | | | | 359/280 |
| 2003/0043058 | A1 | 3/2003 | Jamieson et al. | |
| 2006/0132752 | A1 | 6/2006 | Kane | |
| 2009/0040903 | A1 * | 2/2009 | Tokuyama | G11B 7/0065 |
| | | | | 369/103 |
| 2010/0111521 | A1 * | 5/2010 | Kim | H04L 1/24 |
| | | | | 398/10 |
| 2010/0296077 | A1 * | 11/2010 | Scott | G01S 7/4818 |
| | | | | 356/4.01 |
| 2014/0146303 | A1 * | 5/2014 | Mitchell | G01S 17/08 |
| | | | | 356/5.01 |
| 2014/0231647 | A1 | 8/2014 | Chinn et al. | |
| 2015/0176977 | A1 * | 6/2015 | Abele | G01B 11/2513 |
| | | | | 356/614 |
| 2018/0024036 | A1 | 1/2018 | Ray et al. | |
| 2019/0025430 | A1 | 1/2019 | Rohani et al. | |
| 2019/0265339 | A1 * | 8/2019 | Zhang | H01S 3/2316 |
| 2019/0271767 | A1 | 9/2019 | Keilaf et al. | |

| | | | | |
|---|---|---|---|---|
| 2020/0073358 | A1 * | 3/2020 | Dedkov | B25J 9/1666 |
| 2020/0182988 | A1 * | 6/2020 | Pau | G01S 7/4815 |
| 2020/0333440 | A1 * | 10/2020 | Negoita | G01S 7/4811 |
| 2020/0333533 | A1 * | 10/2020 | Rogers | G01S 17/89 |

FOREIGN PATENT DOCUMENTS

| | | | |
|---|---|---|---|
| CN | 107272016 | A | 10/2017 |
| JP | 2014174041 | A | 9/2014 |
| TW | 201040603 | A | 11/2010 |
| WO | 2019241825 | A1 | 12/2019 |

OTHER PUBLICATIONS

John William Pritchard, "New developments in magneto-optic interferometric switching," Graduate Theses and Dissertations, Iowa State University, 2015; 129 Pages <https://lib.dr.iastate.edu/etd/14502>.

Mani Mina Phd, "Magneto-Optic-Based Fiber Switch for Optical Communications" IEEE Transactions on Magnetics • Nov. 2006; 4 pages <https://www.researchgate.net/publication/224649917.

Frost & Sullivan, Exclusive Whitepaper For Analysis of LiDAR technology for advanced safety "LiDAR: Driving the Future of Autonomous Navigation" 2016; 30 Pages.

Agilitron, "CrystaLatch™ 1x6 Fiber Optic Reflection Switch for LIDAR Sensor Applications" 2017; 3 Pages.

Primanex, "1x16 MagLight™ Optical Switch" Photonics Beyond Boundary, 2016; 4 pages.

Israeli Office Action dated Sep. 11, 2023 for Israeli Application No. 288229; 4 Pages.

Japanese Office Action dated Dec. 8, 2023 for Japanese Application No. 2021-569379; 8 Pages.

International Preliminary Report on Patentability dated Nov. 16, 2021 for International Application No. PCT/IB2020/054784; 13 Pages.

D. Starodubov, K. McCormick, P. Nolan, L. Volfson, T. M. Finegan, "Eye safe single aperture laser radar scanners for 3D acquisition," Proc. SPIE 9829, Radar Sensor Technology XX, 982909 (May 12, 2016); doi: 10.1117/12.2224298.

First Chinese Office Action dated Apr. 11, 2025 for related Chinese App No. 202080038004.2; 17 Pages.

Israeli Office Action dated Jan. 30, 2025 for Israeli Application No. 288229; 5 Pages.

* cited by examiner

SCANNING LIDAR WITH OPTICAL SWITCHING

CROSS-REFERENCE TO RELATED APPLICATIONS

This application is the U.S. national phase of PCT/IB2020/054784 filed May 20, 2020, which claims the benefit of U.S. provisional application Ser. No. 62/850,573 filed May 21, 2019, the disclosures of which are hereby incorporated by reference in their entirety herein.

TECHNICAL FIELD

The disclosure relates to scanning lidar and a method for improving resolution of scanning lidar system.

BACKGROUND

Lidar is an active remote sensing technology that uses light from a transmitter reflected by objects within a field of view (FOV) to determine the range or distance to the objects. This information can be processed to generate an image or otherwise used for mapping, object identification, object avoidance, navigation, etc. in various types of vehicles, such as automotive vehicles or drones, for example. While a number of lidar solutions have been proposed and may be acceptable for particular applications, various strategies have associated disadvantages that may make them unsuitable in other applications. For example, various lidar systems have limited power and associated limited detection range to maintain eye safety, use moving parts to mechanically scan the FOV, have limited frame rates, and are limited in adverse environmental conditions, such as fog, haze, rain, snow, etc.

SUMMARY

A real-time scanning lidar system and method include various embodiments that incorporate all-optical switching so that no moving parts are required. Various embodiments facilitate scanning of a larger field of view (FOV) in three-dimensional space to provide multi-dimensional real-time data, such as location, range, polarization, velocity, etc., with respect to objects within the FOV.

In one or more embodiments, a scanning lidar system includes a transmitter having a laser and a first optical switch configured to receive laser pulses from the laser, a first plurality of fibers each coupled to a different one of a plurality of outputs of the first optical switch, a first at least one optical element configured to receive the laser pulses from at least one of the first plurality of fibers and to redirect the laser pulses to illuminate at least a portion of a field of view, a receiver including a second optical switch and at least one detector, a second plurality of fibers each coupled to a different input of the second optical switch, an output of the second optical switch coupled to the at least one detector, a second at least one optical element configured to receive the laser pulses reflected from the field of view and to redirect received reflected pulses to at least one of the second plurality of fibers, and at least one controller configured to control the first optical switch to direct the laser pulses from an input of the first optical switch to each of the plurality of outputs in turn, to control the second optical switch to direct light from each of the second plurality of fibers in turn to the output of the second optical switch, and to process signals from the at least one detector to generate data representing the field of view. The first optical switch and the second optical switch may be all-optical switches that have no moving parts associated with switching light from the input to one of the plurality of outputs, or from the plurality of outputs to the input, respectively. The first and second optical switches may include a Faraday rotator. In at least one embodiment, the first and second optical switches comprise a magneto-optic switch.

In various embodiments, the system may include a first microprocessor-based controller configured to control the first optical switch and a second microprocessor-based controller in communication with the first controller and configured to control the second optical switch.

In one or more embodiments, the laser comprises a fiber laser or any pulsed laser source connect to a fiber configured to generate pulses having an SWIR wavelength between 900 nanometers (nm) and 1700 nanometers (nm). In at least one embodiment, the laser is configured to generate pulses having a nominal wavelength of 1550 nanometers (nm).

In one or more embodiments, the at least one first optical element comprises an aspherical lens configured to form an output beam having an elliptical cross section. The optical element may be shaped to form an output beam having an angular divergence along a first axis of at least 20 times the angular divergence along a second axis perpendicular to the first axis. In at least one embodiment, the output beam has an angular divergence of 40 degrees in a horizontal direction and one degree in a vertical direction.

In one or more embodiments the system includes a plurality of optical elements, each associated with one of the first plurality of fibers to provide the output beam that illuminates the FOV.

In one or more embodiments, the at least one second optical element comprises collection optics positioned upstream of beam shaping optics, the beam shaping optics configured to form beams having an elliptical cross section. The beam shaping optics may provide a beam having an elliptical cross section with an angular divergence along a second axis at least 20 times the angular divergence along a first axis perpendicular to the second axis. In one embodiment, the receiver includes collection optics and beam shaping optics to provide received light beams having a horizontal divergence of one degree and a vertical divergence of 20 degrees.

In one or more embodiments, the first plurality of fibers is arranged in a first linear array and inputs of the second plurality of fibers are positioned in a second linear array orthogonal to the first linear array.

In various embodiments, the at least one detector comprises an avalanche photodiode. In at least one embodiment, the at least one detector comprises a plurality of detectors configured to operate in parallel.

In one or more embodiments, the laser is configured to transmit polarized pulses and the detector comprises a plurality of detectors each configured to detect received light having a different angle of polarization. The at least one controller may be configured to process signals from the plurality of detectors to generate degree of polarization or angle of polarization data representing the field of view. In at least one embodiment, the first at least one optical element and the second at least one optical element each comprises a polarization rotator controlled by the at least one controller and a polarization phase mask. In at least one embodiment, the first at least one optical element and the second at least one optical element each comprise a first linear polarizer, a Faraday rotator, a half-wave retarder phase mask, and a second linear polarizer. The at least one controller may be configured to operate the laser and the first and second optical switches to refresh the data at 100 Hz to provide 100 frames per second.

In various embodiments, a modular system is provided having a control unit coupled by a fiber bundle to an optical head. In one embodiment, the system includes a housing containing the transmitter, the receiver, and the at least one controller and at least one optical head located outside of the housing and containing the first at least one optical element and the second at least one optical element, wherein the first plurality of fibers and the second plurality of fibers extends between the first housing and optical head. The housing of the control unit may contain a transmitter and a receiver associated with each of a plurality of remotely located optical heads each coupled by an associated fiber bundle.

In at least one embodiment, a vehicle includes a lidar system as described herein with a controller unit connected to one or more head units. The vehicle may include a lidar system having a stationary controller unit optically coupled to a head unit mounted on an actuator configured to rotate the mounted head unit.

Embodiments may also include a method for lidar scanning that includes generating laser pulses, optically switching the laser pulses to each of a first plurality of fibers arranged in a first linear array to illuminate a field of view, directing light reflected from an object illuminated by the laser pulses within the field of view to a second plurality of fibers arranged in a second linear array, optically switching light from the second plurality of fibers to direct the light to at least one detector, and processing signals from the detector to generate data representing the field of view. Generating the laser pulses may include generating laser pulses using a fiber laser having an output wavelength of between 900 nm and 1700 nm. In one embodiment, the nominal output wavelength is 1550 nm to provide increased power for remote sensing while meeting eye safety requirements.

In one or more embodiments, the method includes optically switching the laser pulses and optically switching the light from the second plurality of fibers by controlling an all-optic solid state switch having a Faraday rotator without any moving parts, which may be implemented by a magneto-optic switch, for example.

In one or more embodiments, the method may include shaping the laser pulses output from the first plurality of fibers to form pulsed beams having elliptical cross-sections with an angular divergence along a first axis at least 20 times greater than an angular divergence along a second axis perpendicular to the first axis. In one embodiment, the angular divergence along the first axis is 40 degrees, while the angular divergence along the second axis is one degree.

Various embodiments may include scanning the FOV by directing laser pulses sequentially to a first linear array of fibers positioned orthogonally relative to the second linear array of fibers that receive the reflected light from objects within the FOV.

In at least one embodiment, the method includes optically switching the light from the second plurality of fibers to a single fiber coupled to the detector. In some embodiments, a plurality of detectors is provided and optically switching the light from the second plurality of fibers comprises optically switching light from different groups of fibers to different detectors operating in parallel.

In one or more embodiments, the method includes polarizing the laser pulses that illuminate the field of view, detecting polarization of the light reflected from the object illuminated by the laser pulses, and generating polarization data representing the field of view based on detecting the polarization of the light reflected from the object. The method may also include varying polarization of the laser pulses to increase light intensity detected from a selected one of the second plurality of fibers relative to light intensity from fibers adjacent to the selected fiber.

Embodiments also include a method for improving scanning resolution. The method includes generating a continuous wave (cw) or pulsed laser beam, scanning the laser beam along a first direction to generate a transmitted laser beam to illuminate a field of view, directing light reflected from an object illuminated by the transmitted laser beam within the field of view along a second direction orthogonal to the first direction to form a received beam provided to at least one detector, processing signals from the at least one detector to generate a two-dimensional array of pixels, and varying an intensity profile within a selected pixel to move detected peak intensity in a continuous manner within the selected pixel by synchronously varying polarization of the transmitted laser beam and the received beam provided to the at least one detector.

In one or more embodiments, the method includes varying the intensity profile of the detected received beam within a pixel by directing the generated laser beam or the transmitted laser beam through a Faraday rotator and a phase mask, and controlling the Faraday rotator to vary the polarization of the transmitted laser beam. The method may also include directing the received beam through a second Faraday rotator and a second phase mask, wherein the second Faraday rotator is controlled synchronously with the first Faraday rotator. In one embodiment, the phase mask comprises a half-wave retarder phase mask. In one embodiment, the phase mask comprises a vortex retarder.

In various embodiments, the method includes optically switching the laser beam to direct light to sequentially illuminate a plurality of transmitter fibers arranged in a first linear array and directing light reflected from the object to a plurality of receiver fibers arranged in a second linear array orthogonally positioned relative to the first linear array.

Embodiments may also include a system having a laser configured to generate a laser beam, a first Faraday rotator positioned upstream of a first half-wave retarder phase mask, the first Faraday rotator and the first phase mask selectively varying polarization of an output beam in response to a polarization control signal, a first magneto-optical switch configured to receive the output beam and selectively redirect the output beam to one of a plurality of outputs in response to a transmit scanning control signal to scan the output beam along a first direction to illuminate a field of view, at least one optical element configured to collect light reflected from the field of view along a second direction orthogonal to the first direction, a second magneto-optical switch configured to selectively redirect light from each of a plurality of inputs to an output in response to a receive scanning control signal to scan the light reflected from the field of view along the second direction, a second Faraday rotator positioned to receive light from the output of the second magneto-optical switch and positioned upstream of a second half-wave retarder phase mask, the second Faraday rotator and the second phase mask selectively varying polarization of the received light in response to the polarization control signal, at least one detector positioned to receive light from the second phase mask, and at least one controller configured to generated the transmit and receive scanning signals to control the first and second magneto-optical switches, to process signals from the at least one detector to generate a two-dimensional array of pixels, and to vary an intensity profile within a selected pixel to move peak intensity within the selected pixel by generating the polarization control signal to synchronously control the first and second Faraday rotators to vary polarization of the transmitted laser beam and the received light provided to the at least one detector.

In at least one embodiment, a scanning lidar system includes a central module including a laser and an optical splitter configured to divide output from the laser among a plurality of splitter outputs, a first plurality of connecting fibers each coupled to a different one of the plurality of splitter outputs, and a plurality of optical heads each coupled to the central module by one of the first plurality of connecting fibers. Each optical head includes a first optical switch having an input coupled to an associated one of the first plurality of connecting fibers, a plurality of transmission fibers coupled to an associated output of the first optical switch and having outputs arranged in a linear array along a first direction, at least one transmitter optical element configured to receive laser pulses from at least one of the plurality of transmission fibers and to redirect the laser pulses to illuminate at least a portion of a field of view, a second optical switch, a plurality of receiver fibers each coupled to a different input of the second optical switch, an output of the second optical switch coupled to at least one detector, and at least one receiver optical element configured to receive the laser pulses reflected from the field of view and to redirect received reflected pulses to at least one of the receiver fibers. The system also includes at least one controller configured to control the first optical switch and the second optical switch and to process signals from the at least one detector to generate data representing the field of view, wherein the at least one controller and the at least one detector are disposed within either the central module or the optical head.

In one or more embodiments, a method includes generating laser pulses in a central module, splitting the laser pulses in the central module to deliver the laser pulses to each of a plurality of remotely located optical heads. In each of the plurality of remotely located optical heads, the method includes optically switching the laser pulses to each of a first plurality of fibers arranged in a first linear array to illuminate a field of view, directing light reflected from an object illuminated by the laser pulses within the field of view to a second plurality of fibers arranged in a second linear array, and optically switching light from the second plurality of fibers to direct the light to at least one detector. The method also includes processing signals from the detector to generate data representing the field of view.

In at least one embodiment, a scanning lidar system includes a central module including a pulsed laser, a first magneto-optical optical switch, and a plurality of optical splitters, the magneto-optical switch configured to switch laser output to one of the plurality of optical splitters, each of the plurality of optical splitters configured to divide pulses from the laser among a plurality of splitter outputs, and a plurality of connecting fibers coupled to each output of each of the plurality of optical splitters. A plurality of optical heads remotely located relative to the central module and each coupled to the central module by one of the plurality of connecting fibers associated with each of the plurality of splitter outputs each include a plurality of transmission fibers coupled to each of the plurality of fiber splitters and having outputs arranged in a linear array along a first direction, at least one transmitter optical element configured to receive laser pulses from at least one of the plurality of transmission fibers and to redirect the laser pulses to illuminate at least a portion of a field of view, a second magneto-optical switch, a plurality of receiver fibers each coupled to a different input of the second magneto-optical switch, an output of the second magneto-optical switch coupled to at least one detector, and at least one receiver optical element configured to receive the laser pulses reflected from the field of view and to redirect received reflected pulses to at least one of the receiver fibers. the system also includes at least one controller configured to control the first magneto-optical switch and the second magneto-optical switch and to process signals from the at least one detector to generate data representing the field of view, wherein the at least one controller and the at least one detector are disposed within either the central module or the optical head.

In one or more embodiments, a method includes generating laser pulses in a central module, optically switching the laser pulses to each of a plurality of fiber splitters in the central module, and splitting the laser pulses by each fiber splitter to deliver each laser pulse to each of a plurality of optical heads remotely located relative to the central module. The method includes, in each of the plurality of optical heads, directing the laser pulses from the plurality of fiber splitters to each of a plurality of transmission fibers arranged in a first linear array to illuminate a field of view, directing light reflected from an object illuminated by the laser pulses within the field of view to a plurality of receiver fibers arranged in a second linear array arranged orthogonally to the first linear array, and optically switching light from the receiver fibers to direct the light to at least one detector. The method also includes processing signals from the detector to generate data representing the field of view.

One or more embodiments may provide advantages for various applications. For example, various embodiments according to the disclosure provide a scanning lidar operating at an eye-safe wavelength that does not require any moving parts by using magneto-optic switches orthogonally oriented fiber arrays to scan a field of view and receive reflected light to create an image or multi-dimensional data representing the FOV. One or more embodiments provide improved range, frame rate, reliability, scalability, and robust operation under adverse weather conditions making them suitable for use in autonomous vehicles and drones, for example.

DETAILED DESCRIPTION

Figure 1:
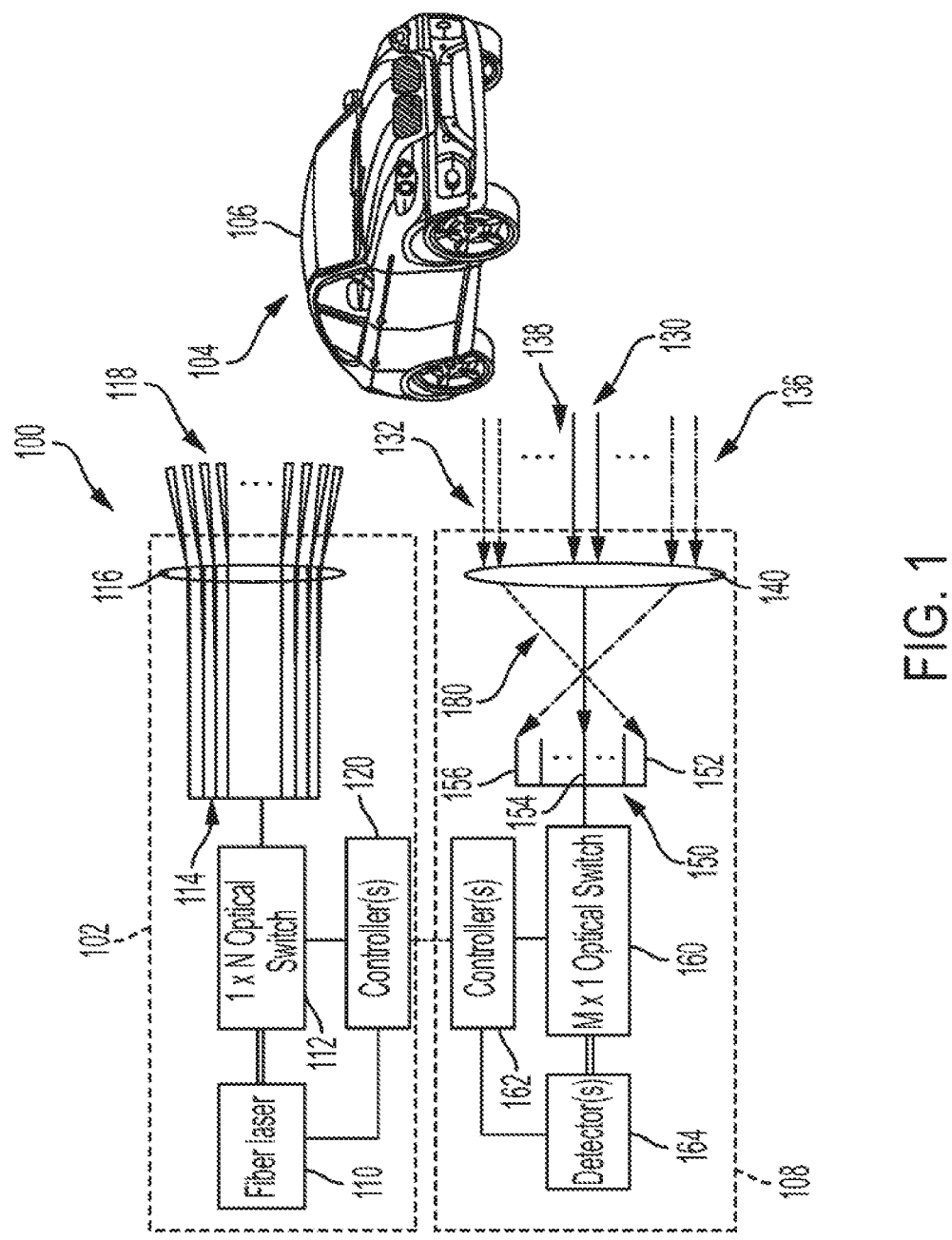
FIG. 1 is a block diagram illustrating operation of a representative embodiment of a system or method for scanning lidar.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this description, an image or related terminology is not limited to a visual representation and refers more generally to a data representation of a field of view (FOV). Different types of data, such as location/position, distance/range, intensity, polarization, velocity, etc., may be collected for each measured point or pixel within the FOV to provide a multi-dimensional data array that may be processed by a controller without generating a visual representation of the data. Similarly, references to a pixel do not imply or require a visual representation or display of associated data, or an area on a display screen, but refer more generally to a discrete measurement point or observation point within the FOV, with underlying discrete measurements for a particular pixel location referred to as sub-pixels that may be used to improve or enhance the resolution within the pixel. For example, sub-pixels corresponding to measurements generated for a particular (x, y) pixel location from different laser pulses or different characteristics/properties of the laser pulse provide additional data that may be used to detect or identify time domain or spatial domain changes within the pixel to enhance resolution.

A vehicle is used in its most general sense as something used to carry, transport, or convey something or self-propelled mechanized equipment.

An optical switch refers to an all-optical switch that maintains the signal as light from input to output in contrast to an electro-optic switch that converts the optical signal to an electric signal and back to an optical signal to route light signals or pulses from one channel to another, i.e. from an input to one of a plurality of outputs, or from one of a plurality of inputs to an output. The all-optical switch may be controlled by an electric signal or electronic controller to provide spatial domain switching of optical signals or pulses. An optical switch with no moving parts refers to a device that does not have any moving mechanical components to perform the switching operation, i.e. excludes movable mirrors such as those provided in MEMS based photonic switches.

An optical element refers to any element or component that acts upon light including discrete elements such as mirrors, lenses (including graded index or gradient index lenses), prisms, gratings, etc. as well as integrated optics and holographic optical elements that may also act on incident light to redirect the light and/or modify one or more properties of the light.

FIG. 1 is a block diagram illustrating operation of a representative embodiment of a system or method for scanning lidar. System 100 includes a transmitter 102 configured to illuminate a field of view (FOV) 104 having at least one object 106 with reflected light from object 106 being detected by a receiver 108. Transmitter 102 includes a laser 110 and a first optical switch 112 configured to receive laser pulses from the laser 110. In various embodiments, laser 110 is a fiber laser operating in a pulsed mode in the SWIR range with an output nominal wavelength between 900 nm and 1700 nm. In at least one embodiment laser 110 operates at a nominal output wavelength of 1550 nm in the eye-safe region so that transmitter 102 may operate with higher power to provide longer range and improved imaging/sensing performance Laser 110 may be operated to provide a data frame rate of between 100-500 Hz, for example, with laser pulse rates between 100-500 KHz, for example. Of course, the data frame rate and laser pulse repetition rate will vary based on the particular application and implementation.

In the representative embodiment illustrated in FIG. 1, first optical switch 112 is an electronically controlled all-optical 1×N switch to transfer optical pulses output by fiber laser 110 from the input of switch 112 to one of the N outputs as controlled by an associated controller, such as controller(s) 120. In one embodiment, optical switch 112 is implemented by a 1×32 magneto-optical switch similar to commercially available switches offered by Agiltron, Inc. of Woburn, MA, USA or Primanex, Inc. of Qingdao, Shandong, China. A magneto-optical switch includes a Faraday rotator to switch the optical pulses so that the switch includes no moving parts to perform the switching operation.

Each of the outputs of switch 112 is coupled to an associated fiber positioned in a linear array along a first axis or direction. In one embodiment, the linear array of transmitter fibers 114 is oriented vertically. The outputs of fibers 114 are positioned at the focal plane of transmission optics 116, which may be implemented by at least one optical element configured to receive the laser pulses from fibers 114 and to redirect the laser pulses such that the light 118 is directed into a different angle to illuminate a corresponding portion of the FOV 104 containing one or more objects 106. The at least one optical element may include a diverging lens or one or more asymmetric, aspherical, and/or cylindrical optical elements to provide an oval or elliptical output beam at a specified angle based on the desired coverage portion of FOV 104 (best illustrated in FIG. 2). The at least one optical element may include one or more lenses with each lens associated with a single one of fibers 114, a group of fibers 114, or all fibers 114.

Receiver 108 receives central light rays 130 and off-axis light rays 132, 136 within reflected light 138 from object 106 within the FOV 104. Receiver optics 140 includes at least one optical element configured to collect and receive the laser pulses reflected from the FOV 104 and to redirect received reflected pulses to at least one of a second plurality of fibers 150. Fibers 150 are arranged in a linear array oriented orthogonally relative to the linear array of the transmitter fibers 114. In one embodiment, fibers 150 are oriented horizontally (best shown in FIG. 3). Of course, the orientation of the linear fiber arrays of the transmitter and receiver may be reversed with the transmitter fibers oriented horizontally and the receiver fibers oriented vertically. Other orthogonal orientations are also possible depending on the particular application and implementation.

In the representative embodiment of FIG. 1, receiver optics 140 are configured to collect and redirect off-axis reflected light rays 132 to an associated fiber 152, while representative central rays 130 are collected and redirected to a fiber 154 and representative off-axis rays 136 are collected and redirected to a fiber 156 within fiber array 150. Receiver optics 140 includes at least one optical element, which may include collection optics upstream of beam shaping optics configured to form beams having an elliptical cross section. The at least one optical element may include a converging lens or one or more asymmetric, aspherical, and/or cylindrical optical elements to provide an oval or elliptical output beam. The at least one optical element may include one or more lenses with each lens associated with a single one of fiber array 150, a group of fibers within fiber array 150, or all fibers of fiber array 150.

Each fiber of fiber array 150 is coupled to a different input of a second optical switch 160. Optical switch 160 may be implemented by an all optical switch with no moving parts similar to first optical switch 112. In one embodiment optical switch 160 is a M×1 magneto-optical switch that sequentially connects one of the M inputs coupled to an associated fiber within fiber array 150 to an output connected to detector(s) 164 as controlled by associated controller(s) 162. In one embodiment optical switch 160 is a 32×1 magneto-optical switch such that system 100 provides a 32×32 array of pixels or data for a 40° horizontal by 20° vertical FOV as described in greater detail herein. Of course, the vertical and horizontal extent, number of pixels, and FOV covered need not be symmetric or proportional to the representative embodiments and will vary by application and implementation.

In one embodiment, at least one controller 120, 160 is a microprocessor-based controller having associated non-transient memory or computer readable media for storing data representing instructions executable by the controller(s) to perform one or more control functions or algorithms and is thereby configured to control the first optical switch 112 to direct the laser pulses from fiber laser 110 from an input of the first optical switch 112 to each of the plurality of outputs coupled to associated fibers 114 in turn. The at least one controller 120, 160 controls the second optical switch 160 to direct light from each of the second plurality of fibers 150 in turn to the output of the second optical switch 160, and to process signals from the at least one detector 164 to generate data representing the field of view. Each of detector(s) 164 may be implemented by a photodiode such as an avalanche photodiode (APD), a PIN diode, a Schottky barrier photodiode, or any other optical detector with similar sensitivity that provides the desired signal-to-noise ratio (SNR) for a particular application. Where more than one controller is provided, the controllers may communicate to exchange data and/or coordinate or cooperate to perform a particular task, function, algorithm, etc.

In general, the processes, methods, or algorithms disclosed herein can be performed by a processing device, controller, or computer, which can include any existing programmable electronic control unit or dedicated electronic control unit or controller. Similarly, the processes, methods, or algorithms can be stored as data and instructions executable by a controller or computer in many forms including, but not limited to, information permanently stored on non-writable storage media such as ROM devices and information alterably stored on writeable storage media including electronic, magnetic, and/or optical storage devices. Certain processes, methods, or algorithms may also be implemented in a software executable object. Alternatively, the processes, methods, or algorithms can be embodied in whole or in part using suitable dedicated or custom hardware components, such as Application Specific Integrated Circuits (ASICs), Field-Programmable Gate Arrays (FPGAs), state machines, controllers, or any other hardware components or devices, or a combination of hardware, software and firmware components. Similarly, illustration or description of a process, algorithm or function in a particular sequence or order may not be required to perform the described operation or outcome. Some processes, functions, algorithms, or portions thereof may be repeatedly performed, performed in a different sequence, or omitted for particular applications.

Figure 2:
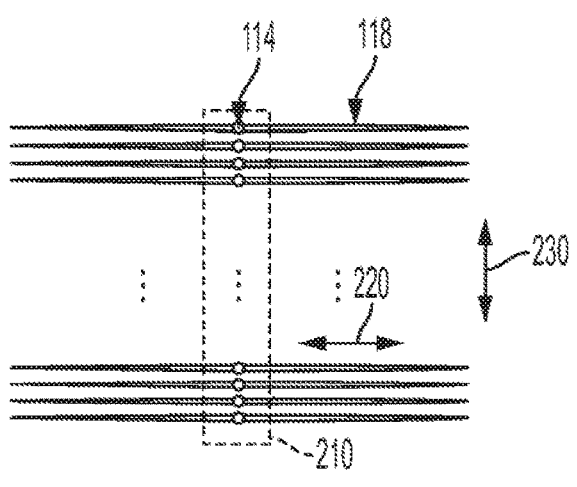
FIGS. 2 and 3 are diagrams illustrating beam cross-sections from a linear array of fibers for a transmission beam or received reflected light directed into an orthogonally positioned linear array of fibers in a representative embodiment.

FIG. 2 is a diagram illustrating a transmission beam cross-section or front view for a linear array of fibers in a representative embodiment. As illustrated in FIG. 2, the optics in the transmitter may not be symmetric but rather asymmetric, aspherical, or cylindrical in nature, so that each beam of the output light 118 is shaped by the non-spherical optics to have an oval or elliptical beam cross section or front view. Each beam has a very wide angular divergence in the horizontal plane or direction 220 and narrow angular divergence in the vertical plane or direction 230, or vice versa. In one embodiment, the horizontal angular divergence is 40 degrees with a vertical angular divergence of 1 degree. This beam shape can be achieved, for example, by placing a small aspherical/cylindrical lens in front of every fiber 114 within linear array 210 or a larger lens common to groups or all fibers as previously described. As such, the transmitter directs each laser pulse across a wide horizontal coverage and narrow vertical coverage or vice versa. Additional vertical coverage for the FOV is provided by scanning the laser pulses using the optical switch across adjacent fibers to cover the desired FOV. Each pulse may be separated in time to reduce or eliminate overlap.

Figure 3:
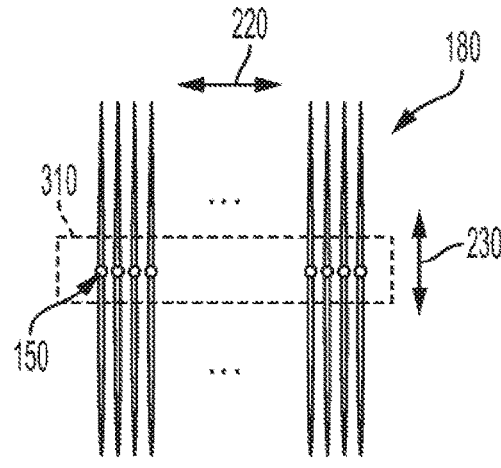

FIG. 3 is a diagram illustrating a cross-section of received reflected light directed into a linear array 310 of fibers 150 arranged orthogonally relative to the linear array 210 of transmission fibers 114 (FIG. 2) in a representative embodiment. As previously described, the receiver optics is configured to receive the laser pulses reflected from the FOV and to redirect received reflected light to each of the fibers 150. The fibers are scanned or switched by the associated optical switch to direct the received light to the detector(s). As described with respect to FIG. 1, the received light is directed or coupled to one of the plurality of fibers 150 in the linear array 310. The receiving "beams" in space look very similar to the transmission beams only rotated by 90 degrees, as generally illustrated in FIGS. 2 and 3. The shaping of the receiving beams to the oval or elliptical cross section is performed using similar techniques and components as described above with respect to shaping the transmission beam. In one embodiment, the received light "beams" each cover an angle in the horizontal direction 220 of 1° and an angle in the vertical direction 230 of 20°.

Although the orthogonally positioned linear arrays of fibers are illustrated as a vertical transmission array and a horizontal receiver array, any other orthogonal orientation is possible. Similarly, although the representative embodiments include examples having a transmission fiber array with 32 fibers and a receiver fiber array of 32 fibers, the transmission and receiver arrays may contain different numbers of fibers depending on the particular application. Likewise, although transmission optics generate beams having angular divergence of 40×1 degrees and receiver optics to generate light having angular divergence of 1×20 degrees, the transmitter and receiver optics may be selected to provide different angular divergences depending on the particular application.

Figure 4:
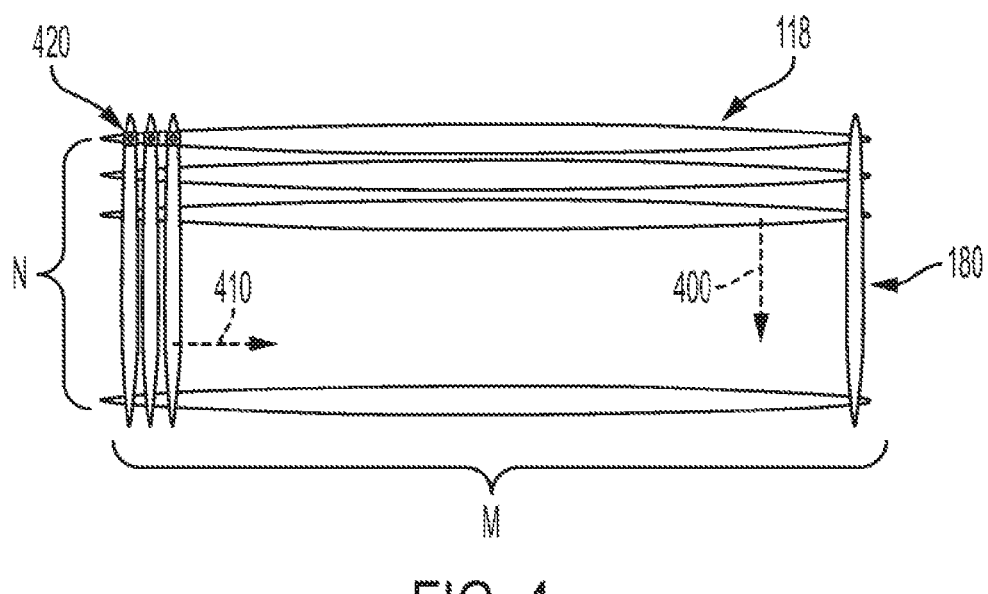
FIG. 4 illustrates multi-dimensional data generated from detector signals associated with overlapping points or pixels corresponding to a combination of the optically switched or scanned transmitted and received light pulses.

FIG. 4 illustrates multi-dimensional data generated from detector signals associated with overlapping points or pixels corresponding to a combination of the optically switched or scanned transmitted and received light pulses. The transmitted elliptical pulses 118 are scanned using the transmitter optical switch to direct pulses into each fiber sequentially or in turn as indicated at 400. The received light or "beams" 180 are scanned using the receiver optical switch to direct light from each receiver fiber to the detector as represented at 410. The intersection of the transmitted and received beam provides an array of pixels 420 representing the data generated by the detector signals for a particular position/location. As such, if the transmitter optical switch is configured to direct one or more laser pulses to fiber indexed i and the receiving optical switch is configured to direct received light from fiber number j to the detector(s), then the light signal that will be received at the detector will come from the angle defined by the $(i, j)^{th}$ element of the 2D pixel array of pixels 420 defined by the combination of the transmitting and receiving beams. As defined in greater detail below, multiple laser pulses may be provided to one transmitter/receiver fiber pair before operating the switches to scan to the next adjacent transmitter/fiber pair to provide multiple measurements for each pixel 420 to improve SNR as described below. Similarly, switching may occur after each laser pulse with multiple data associated with each pixel combined or otherwise processed to provide desired performance.

In one representative embodiment, each laser pulse associated with each of 32 transmission fibers has an instantaneous FOV of 40°×1°. Each receiver instantaneous FOV is 1°×20° and the laser is scanned from top down and the receiver from left to right, creating a matrix of pixels 420 that include 32×32 (or more generally N×M) pixels defined by the intersection of the transmitted and received light. The scanning is based on transmitter/receiver optical switches implemented by 1×32 magneto-optic switches with a switching time of less than 10 μsec. The fiber laser characteristics are assumed to provide PRF*32*32 pulses/second or approximately 100 k pulses/second to provide the desired SNR with an average laser power of 100 k*30 microjoules=3 W. Representative signal calculations are shown below.

| Parameter | Value | Description |
| --- | --- | --- |
| $E_p$ | 30 μJ | Pulse energy |
| $\tau_p$ | 10 ns | Pulse width |
| $IL_{tx}$ | 5 db | Insertion loss of TX switch |
| $IL_{rx}$ | 5 db | Insertion loss of RX switch |

-continued

| Parameter | Value | Description |
| --- | --- | --- |
| $A_r$ | $\pi r^2$ | Area of Rx optics |
| R | 2.5 cm | Radius of receiver optics |
| R | 200 m | Test range to target |
| $\Sigma$ | 0.06 | Reflectance of target |
| $S_t$ | 0.1° × 0.1° | Reflecting surface size at R |
| $TX_{FOV}^{az}$ | 40° | Transmitter azimuthal FOV |
| $TX_{FOV}^{el}$ | 1° | Transmitter elevation FOV |
| PRF | 100 Hz | Frame rate |

The instantaneous peak power that falls on the target is provided by:

$$P_{target} = \frac{E_p}{\tau_p} IL_{tx}$$

Assuming a target size as small as the minimal resolution for the system to detect, $S_t$, the reflected signal from this target object is given by:

$$P_{reflected} = \frac{P_{target} S_t}{TX_{FOV}^{el} TX_{FOV}^{AZ}} \sigma$$

In a worst case scenario, the reflected signal from the target object is distributed evenly over half a dome toward the transmitter unit, and therefore the collecting optics in the receiver collects the following amount of power from the target object:

$$P_{received} = \frac{P_{reflected} A_r}{R^2} IL_{rx}$$

Inserting the values for each one of the parameters above gives:

$$P_{received} \cong 2*10^{-10} W$$

While it may be difficult to detect such a signal from a single pulse, repeating the pulses to generate sub-pixel measurements for each pixel with a frame rate of 100 Hz, for example, can provide an improvement factor of 10 for the SNR, so the effective received signal will be:

$$P_{received} \sqrt{PRF} \cong 2*10^{-9} W$$

This signal level can clearly be detected by a sensitive photodiode such as an avalanche photodiode or similar optical detector.

The laser pulse frequency can be increased with an upper system constraint established by a rate at which transmitted pulses may overlap or intersect at the receiver if the pulses are close enough in time, i.e. a pulse is transmitted before the previously transmitted pulse has been reflected by an object and detected by the receiver. Assuming a buffer time of 2 microseconds (600 m) between pulses to prevent the pulses from intermixing, the maximum laser frequency for a typical application would be 500 KHz. This repetition rate may provide a corresponding rate of 500K sub-pixels/sec and an average laser power of 15 W. As 15 W is a rather large laser average power, multiple detectors may be provided to operate in parallel to cover the FOV of the system. For example, a system having four avalanche photodiodes in parallel instead of a single detector as described above facilitates a 125 KHz laser (3.8 W average laser power) while providing 500K sub-pixels/sec data rate. Similarly, a system having eight detectors with a 125 KHz laser frequency can generate 1M sub-pixels/sec. A representative system having multiple detectors operating in parallel is illustrated and described with respect to FIG. 9. Of course, the polarization filters would be omitted so that all parallel detectors are detecting the same characteristic of the received light.

Alternatively, or in combination, search resources may be allocated based on detection of objects in previous frames. This strategy will effectively increase the resolution of detection without the need to increase the number of overall pixels in the system by allocating additional search sub-pixels directed only to areas where objects were detected in previous frames.

Figure 5:
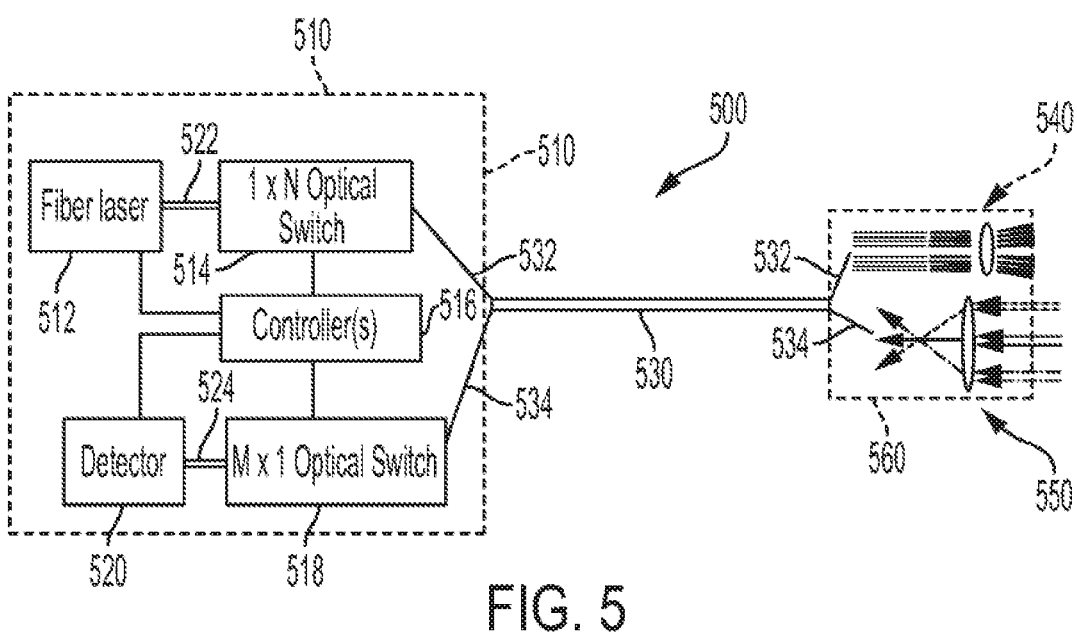
FIG. 5 illustrates a modular configuration or architecture for a scanning lidar sensor having a controller or central unit and at least one optical head of a representative embodiment.
Figure 6:
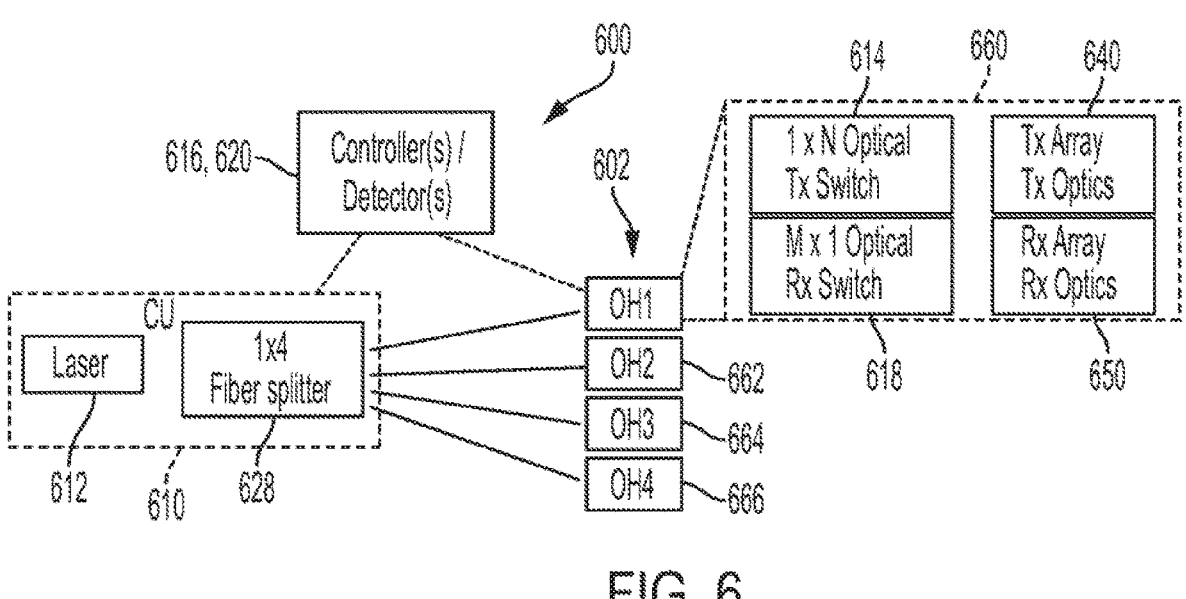
FIG. 6 illustrates a modular configuration or architecture for a scanning lidar sensor having a central unit with an optical splitter upstream of a transmitter optical switch coupled to multiple optical heads in another representative embodiment.
Figure 7:
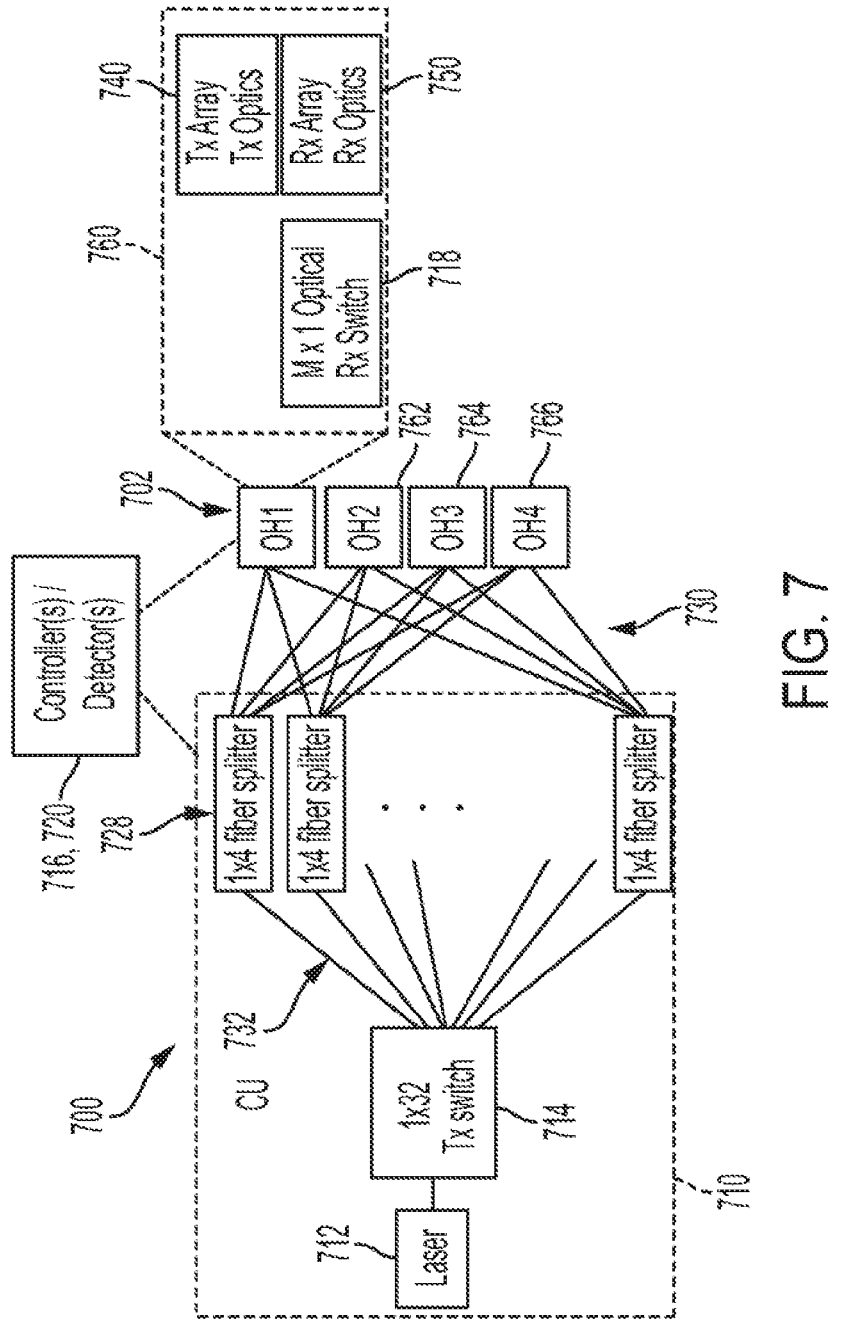
FIG. 7 illustrates a modular configuration or architecture for a scanning lidar sensor having a central unit with an optical splitter downstream of a transmitter optical switch coupled to multiple optical heads in another representative embodiment.

FIG. 5 illustrates a modular configuration or architecture for a scanning lidar sensor having a controller or central unit (CU) and at least one optical head (OH) of a representative embodiment. The various modular configurations or architectures illustrate in FIGS. 5-7 are understood to have components similar to those described with respect to the embodiment of FIG. 1 unless otherwise stated, and are not described again in detail. However, various components may be arranged differently within either the CU or OH depending on the particular embodiment, and additional components may be used to facilitate specific embodiments.

System 500 includes a CU module 510 with a first housing and OH module 560 in a second housing coupled by a fiber bundle 532. In the representative embodiment of FIG. 5, CU module 510 includes fiber laser 512, first optical switch 514, controller(s) 516, second optical switch 518 and detector(s) 520. Fiber laser 512 is coupled to first optical switch 514 via fiber 522, or may be directly coupled. Transmitter fibers 532 are coupled to the output of first optical switch 514. Similarly, receiver fibers 534 are coupled to second optical switch 518. Fiber bundle 530 includes transmitter fibers 532 and receiver fibers 534. OH 560 includes transmitter optics 540 and receiver optics 550. As such, OH module 560 contains only optical fibers and optical components, and is connected to the CU 510 through optical fiber bundle 530. As illustrated and described in greater detail with respect to FIGS. 6-7, multiple OH modules can be connected to a single CU module to expand the covered FOV of the system. In this embodiment, the CU module 510 contains the laser, optical switches, detection electronics, and processor. The OH module 560 is relatively small in dimensions and can be remotely located relative to the CU module 510. As such, the OH module 560 may be placed in various locations of a vehicle, drone, robot, etc.

FIG. 6 illustrates a modular configuration or architecture for a scanning lidar sensor having a central unit with an optical splitter upstream of a transmitter optical switch coupled to multiple optical heads in another representative embodiment. System 600 includes a plurality of OH modules 602 coupled to a remotely located CU module 610. CU module 610 includes laser 612 and a fiber splitter 628, implemented by a 1×4 fiber splitter in this representative embodiment. Controller(s) 616 and detector(s) 620 may be located either within CU module 610 or one or more OH modules 602. Plurality of OH modules 602 include four OH modules 660, 662, 664, and 666 in this representative embodiment. Each of the OH modules includes a transmitter optical switch 614, a receiver optical switch 618, transmitter linear array and associated optics 640, and a receiver linear array and associated optics 650. As such, system 600 includes one CU 610 and N independent OH modules 602 (4 in this example), each covering a specific part of the overall FOV of the system. This architecture maintains independency for each OH 602 to have its own associated scan pattern, but the overall solution may be more expensive and have larger size and complexity.

FIG. 7 illustrates a modular configuration or architecture for a scanning lidar sensor having a central unit with an optical splitter downstream of a transmitter optical switch coupled to multiple optical heads in another representative embodiment. System 700 includes a plurality of OH modules 702 and a single CU module 710. The CU module 710 includes a laser 712, a transmit switch 714 with output fibers 732 connected each connected to one of a plurality of fiber splitters 728. In the representative embodiment illustrated, (32)–1×4 fiber splitters 728 are provided so that each of the fiber splitters 728 is coupled to all of the OH modules 702 by associated transmission fibers 730. Controller(s) 716 and Detector(s) 720 may also be provided either within CU module 710 or one or more OH modules 702.

In the embodiment of FIG. 7, OH modules 702 include a first OH module 760, a second OH module 762, a third OH module 764, and a fourth OH module 766 remotely located from CU module 710 and coupled by one or more fiber bundles 730. Each OH module 702 includes a receiver optical switch 718, transmitter linear array and transmitter optics 740, and receiver linear array and receiver optics 750. In this embodiment, system 700 includes a single CU module 710 and N non-independent OH modules 702, where each scan step is done in parallel in each OH module 760, 762, 764, and 766. This facilitates smaller OH modules 702 that are generally lower cost, but the scan pattern of the overall field of view is fixed and is a replica of the scan pattern of one of the OH modules 702.

Figure 8:
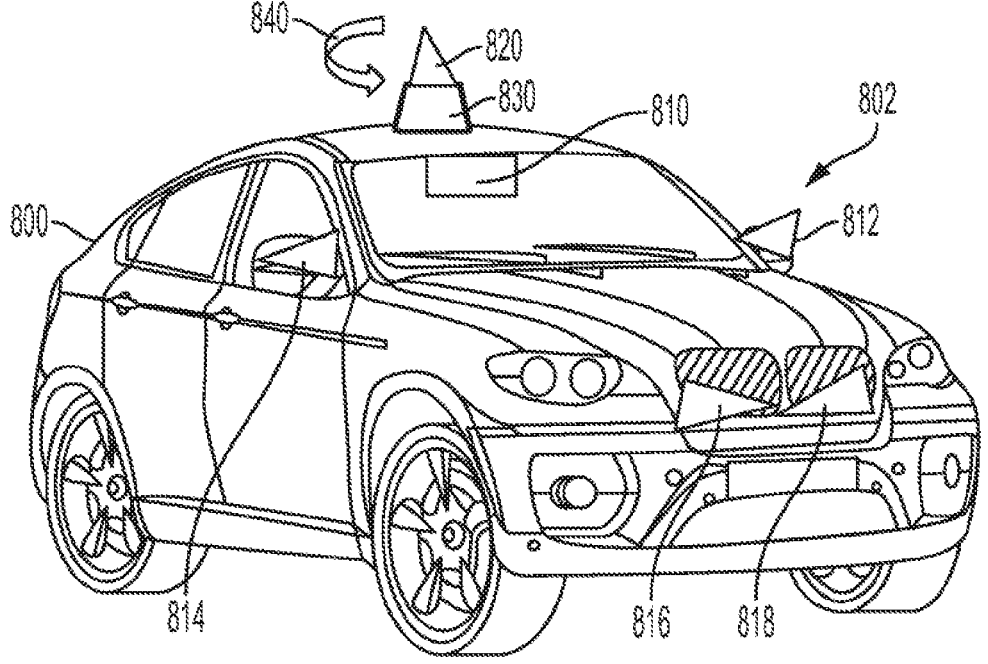
FIG. 8 illustrates a representative embodiment of a vehicle having a scanning lidar sensor with a rotating optical head and/or one or more stationary optical heads.

FIG. 8 illustrates a representative embodiment of a vehicle having a scanning lidar sensor with a rotating optical head and/or one or more stationary optical heads. Vehicle 800 includes a plurality of OH modules 802 coupled to a remotely located CU module 810. OH modules may be placed at various positions around the vehicle 800 such as OH modules 812, 814 positioned on respective side-view mirrors, OH modules 816, 818 placed on a front grille or bumper. Fixed OH modules may also or alternatively placed at any number of positions including different faces/corners of the vehicle 800, inside headlights, frames, mirrors, etc. One or more embodiments may utilize the headlight integrated optics to collect light for the OH units.

Alternatively, or in combination, vehicle 800 may include an OH module 820 connected to a motor/actuator 830 that rotates to scan 360° as represented at 840. One or more rotating units may integrate an OH module with a rotating mirror, or deliver the light from an OH module through a rotating mirror on the roof or side of a vehicle. The CU module may deliver the laser light to/from the rotating OH module through one or more free space optical elements with no physical connection between the rotating OH module and the fixed CU module.

Figure 9:
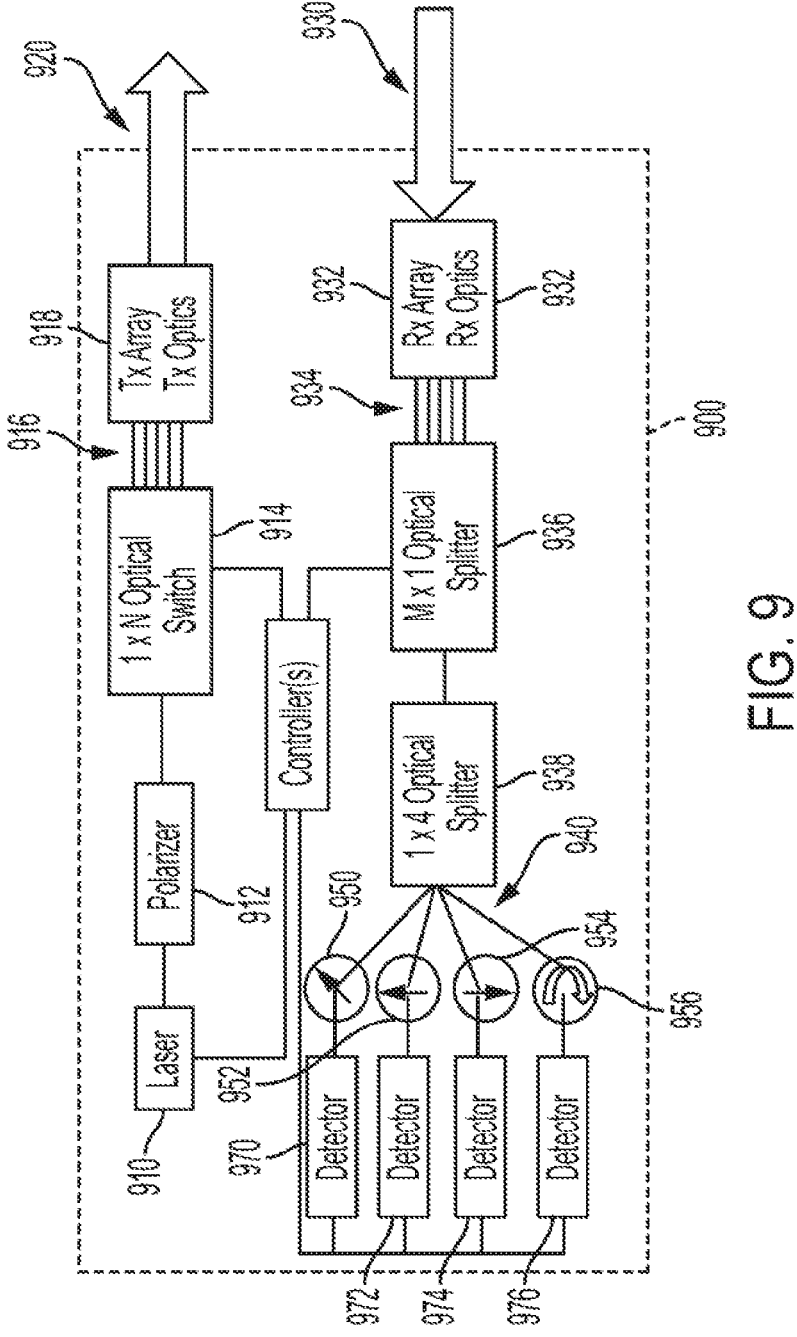
FIG. 9 is a block diagram illustrated a scanning lidar with optical switches and multiple detectors to detect polarization of reflected light according to various embodiments.

FIG. 9 is a block diagram illustrated a scanning lidar with optical switches and multiple detectors to detect polarization of reflected light according to various embodiments. System 900 includes a laser 910 configured to transmit polarized pulses. In the illustrated embodiment, system 910 includes a polarizer 912 between laser 910 and transmitter optical switch 914. Polarizer 912 may be omitted if laser 910 generates polarized light suitable for the application. Optical switch 914, transmitter fibers 916 and transmitter linear array and optics 918 are configured to preserve the polarization of the polarized pulses to deliver associated polarized output beams 920 similar to the previously described embodiments. Reflected light 930 from objects within the FOV passes through receiver collection optics and beam shaping optics and into the receiver linear array 932 of fibers 934. Switch 936 scans fibers 934 to sequentially couple each of fibers 934 to optical splitter 938, which splits or redirects the light to outputs 940 connected to detectors 970, 972, 974, and 976 operating in parallel. Each detector 970, 972, 974, and 976 may have an associated polarization filter 950, 952, 954, and 956 to detect light having corresponding polarizations.

As illustrated in FIG. 9, the laser pulses transmitted through each one of the fibers 916 is polarized, with the collection optics of the system, including the free space optical elements 918, 932 and the receiving optical fibers 934 selected to maintain the polarization of the reflected signal from the target object. As such, system 900 can collect information not just on the reflectance of the target object or its shape, but also on its Degree Of Polarization (DOP) and Angle Of Polarization (AOP). Because each detector 970, 972, 974, and 976 has a different linear polarizer 950, 952, 954 aligned at angles of 0, 45, and 90 degrees or circular polarizer 956 in front of its front surface, the different polarization components of each reflected signal may be used to calculate the DOP and AOP of natural and/or man-made targets very accurately. DOP/AOP information may be used to advantage in driver assistance systems and autonomous vehicles.

AOP and/or DOP images are very robust and survive strong interference by the atmosphere such as scattering through fog, haze or rain. In such atmospheric conditions, the reflected signal intensity from a target tends to diminish and be masked by the light reflected and scattered by the particles or water droplets in its optical path. However, DOP/AOP information from the target is maintained and therefore can be used to sense or see through fog and haze to much longer ranges relative to simple intensity information. Polarization information may also help detect and classify small objects on smooth surfaces (such as a flat tire on the road, or a pit or crack in a road) that are almost undetectable by using just the intensity image of the reflected signal. Polarization information may also help detect and classify surface characteristics to alert a driver, such as a road surface containing water, oil, ice, black ice etc.

Figure 10:
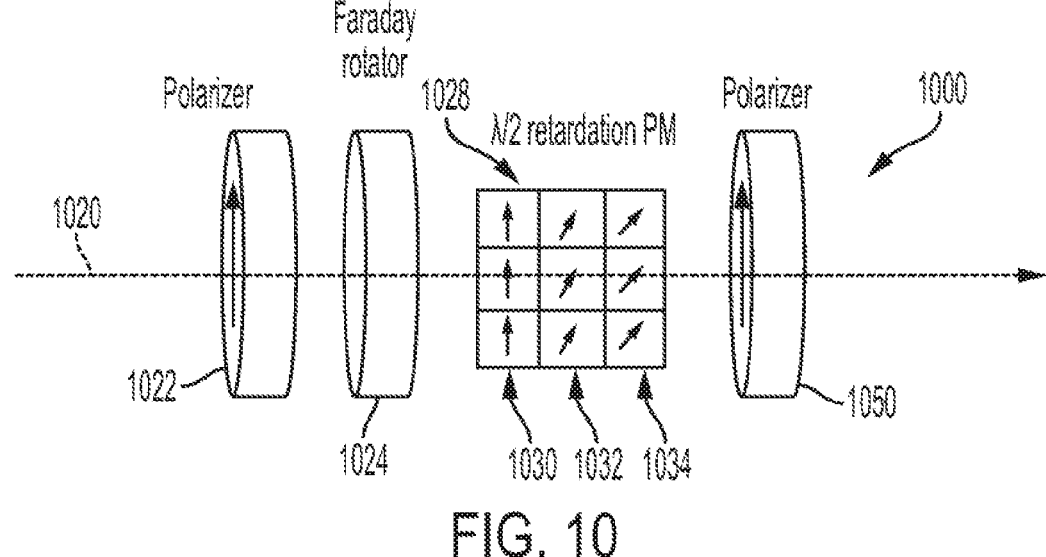
FIG. 10 illustrates a representative embodiment of a system or method for improving resolution within a pixel of a laser scanned FOV by manipulating or scanning polarization of the transmitted and received light using a Faraday rotator and phase mask.

FIG. 10 illustrates a representative embodiment of a system or method for improving resolution within a pixel of a laser scanned FOV by manipulating or scanning polarization of the transmitted and received light using a Faraday rotator and phase mask to generate sub-pixel data. This strategy may be employed in one or more of the previously described embodiments, or other laser scanning systems to increase the resolution of scan of the system. The system or method involve inserting a polarization phase mask and polarization manipulation component into the optical train of both the transmitted and received light. The polarization manipulation may be performed electronically such that there are no moving parts in the scanning process as previously described with respect to one or more embodiments. There are various ways to provide polarization manipulation within the optical path of the transmitted and received beams other than illustrated in FIG. 10 that are within the scope of the claimed subject matter and will be recognized by those of ordinary skill in the art.

System 1000 includes an optical path 1020 for the transmitted and received beams that includes a linear polarizer 1022 positioned upstream of a Faraday rotator (FR) 1024, which, in turn is positioned upstream of a phase mask (PM) 1028 and a second linear polarizer 1050. System 1000 may be placed in front of each transmission fiber in any of the previously described embodiments, for example.

Phase mask 1028 may comprise a liquid crystal polymer (LCP) retarder, which is half-wave retarder designed to affect the radial and azimuthal polarization of optical fields. A commercially available vortex retarder, for example, has a constant retardance across the clear aperture but its fast axis rotates continuously over the area of the optic. There is no practical limit to the flexibility in designing the fast axis distribution on the phase mask to produce a desired distribution of polarized light immediately downstream of the phase mask. In the representative embodiment of FIG. 10, phase mask 1028 is a half-wave retarder phase mask that includes three columns 1030, 1032, and 1034 each having a retardation axis rotated at a different angle. This design allows the Faraday rotator (FR) 1024 to turn or rotate the input linear polarization produced by the linear polarizer 1022 to be parallel to one of the retardation axes 1030, 1032, 1034 on the phase mask 1028. The FR 1024 is controlled electronically by supplying variable voltage. If the selected polarization direction is parallel to the retardation axis in the first column 1030 of the PM, the intensity of the light that follows the second polarizer 1050 will have peak intensity along the line of column 1030, with reducing intensity toward column 1032 and 1034 that have axes rotated relative to the input polarizer 1022. The FR 1024 can then select a second angle of rotation that will align the polarization to the second column 1032 of the PM 1028. In that case the peak intensity following the second polarizer 1050 will move to the second column 1032 and the other columns 1030, 1034 will have lower intensity and look much darker. In a similar manner, the FR 1024 can select any column 1030, 1032, 1034 to be enhanced in intensity after the second polarizer 1050 and therefore "scan" the peak intensity across the horizontal direction with three sub-pixels Similar optics may be placed in front of the receive channel of the system with the same scan mechanism, but with the receiver PM rotated 90 degrees relative to the transmission PM. This will allow the transmitter/receiver pair to enhance a different square in the PM and therefore a different portion of the selected pixel based on the nine possible sub-pixels of the field of view of each of the fibers. This strategy may be applied to a single pixel location to provide sub-pixel resolution by scanning the polarization using the FR across the PM, which results in scanning the peak intensity of the received pulses across a pixel rather than a portion or region of the FOV represented by a group of pixels.

Figure 11:
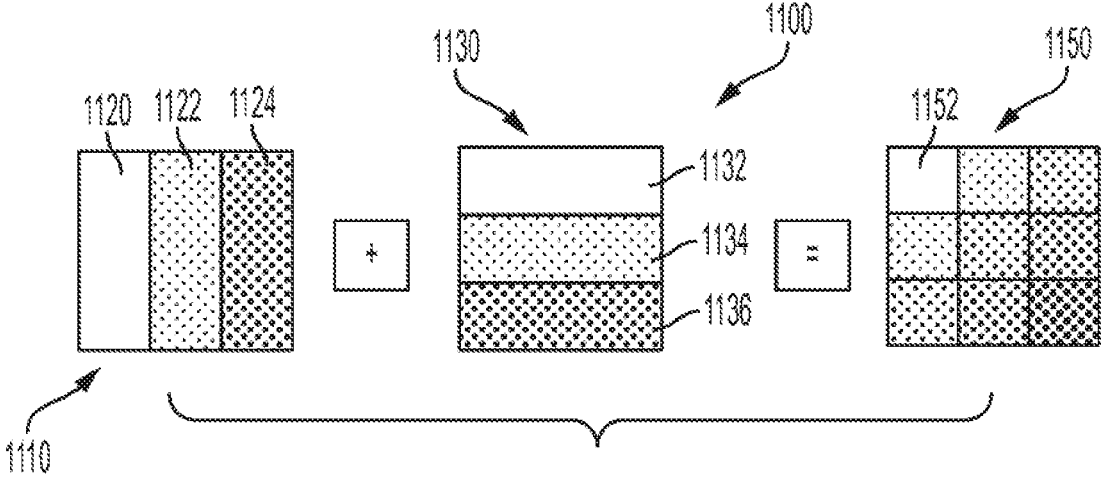
FIG. 11 illustrates increasing intensity within a portion of a pixel of a laser scanned FOV by manipulating polarization of the transmitted and received light according to various embodiments.

The combination of the transmitter and receiver polarization scan patterns provides the ability to emphasize the power of a specific pixel within a group of pixels, or a particular region within a single pixel as generally represented in FIG. 11.

With reference to FIGS. 10 and 11, pattern 1110 represents peak intensity distribution of a transmitted beam having system 1000 in the optical path after the light exits the second polarizer 1050 with the FR 1024 controlled to align with the first column 1030 of PM 1028. This results in column 1120 having higher peak intensity relative to column 1122 and column 1124. Pattern 1130 represents peak intensity distribution of received light having a system 1000 in the optical path, but with PM 1028 rotated by 90 degrees and the FR controlled in a coordinated manner as the FR in the transmission path, after the received light exits polarizer 1050. This results in the top row 1132 having higher peak intensity than the middle row 1134 and bottom row 1136. The combined transmitter/receiver scan 1150 illustrates the resulting distribution of power or intensity with pixel or sub-pixel 1152 having a higher peak intensity than surrounding sub-pixels/pixels. By switching or scanning the polarization state, the position of the brightest pixel or sub-pixel can be quickly shifted to various positions to scan an area of interest with variable intensity to improve resolution.

Figure 12:
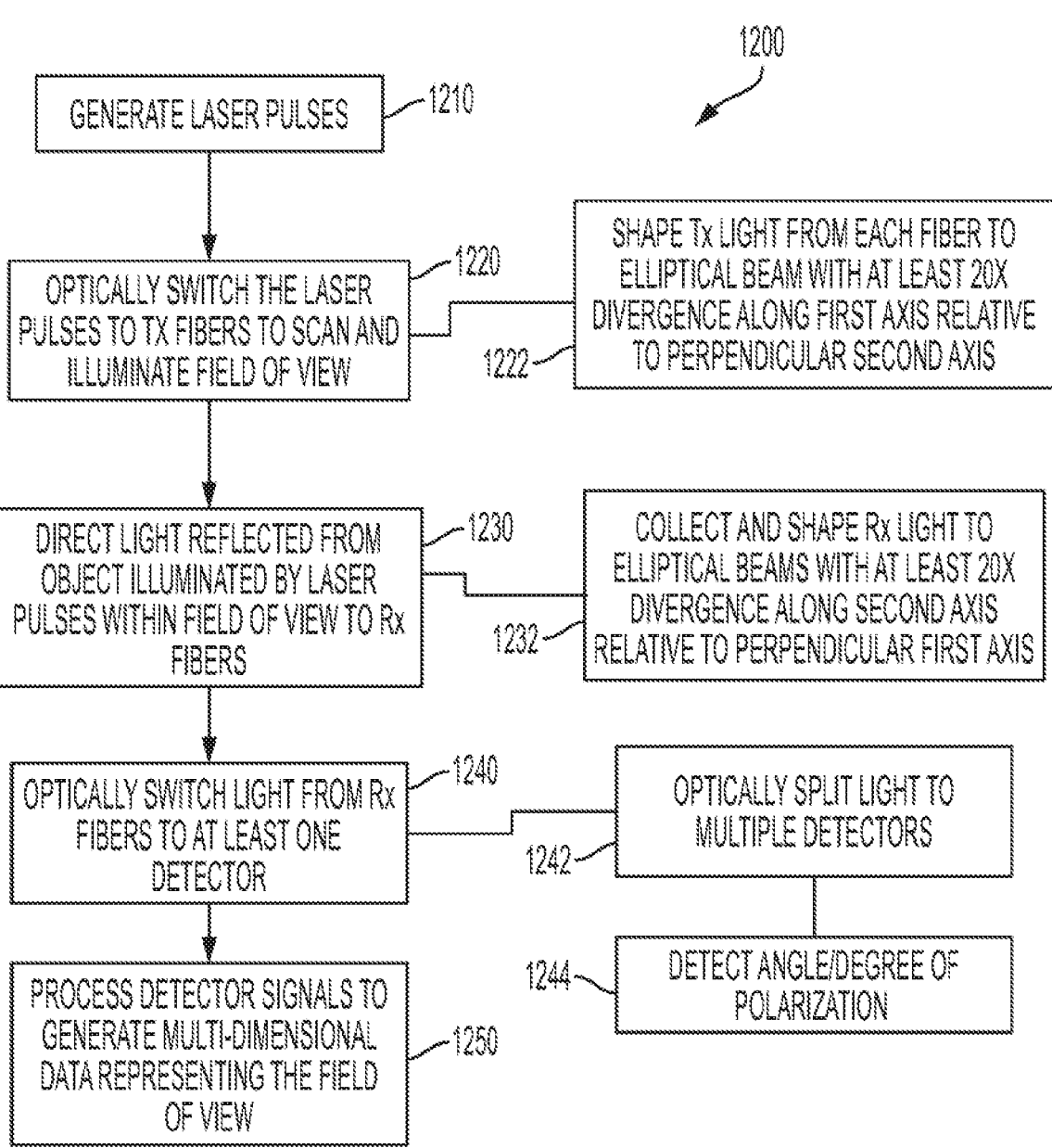
FIG. 12 is a flowchart illustrating operation of a system or method for lidar scanning using optical switching according to one or more embodiments.

FIG. 12 is a flowchart illustrating operation of a system or method for lidar scanning using optical switching according to one or more embodiments. The system or method 1200 include generating laser pulses at 1210, which may include generating laser pulses using a fiber laser having an output nominal wavelength of between 900 nm and 1700 nm. The system or method include optically switching the laser pulses to each of a first plurality of fibers arranged in a first linear array to illuminate a field of view at 1220. This may include shaping the laser pulses to form an elliptical beam with at least 20 times greater angular divergence along a first axis relative to angular divergence along a perpendicular second axis as represented at 1222.

Block 1230 represents directing light reflected from an object illuminated by the laser pulses within the field of view to a second plurality of fibers arranged in a second linear array. This may include collecting and shaping light to form elliptical beams with an angular divergence along a second axis at least 20 times greater than the angular divergence along a perpendicular first axis at 1232. The system or method may also include optically switching light from the second plurality of fibers to direct the light to at least one detector as represented at 1240, which may include optically splitting the received light to direct a portion of the received light to each of a plurality of detectors arranged in parallel as indicated at 1242. The system or method may further include detecting the angle and/or degree of polarization of the received light as represented at 1244. The detector signals are then processed to generate data representing the field of view as represented by block 1250.

Figure 13:
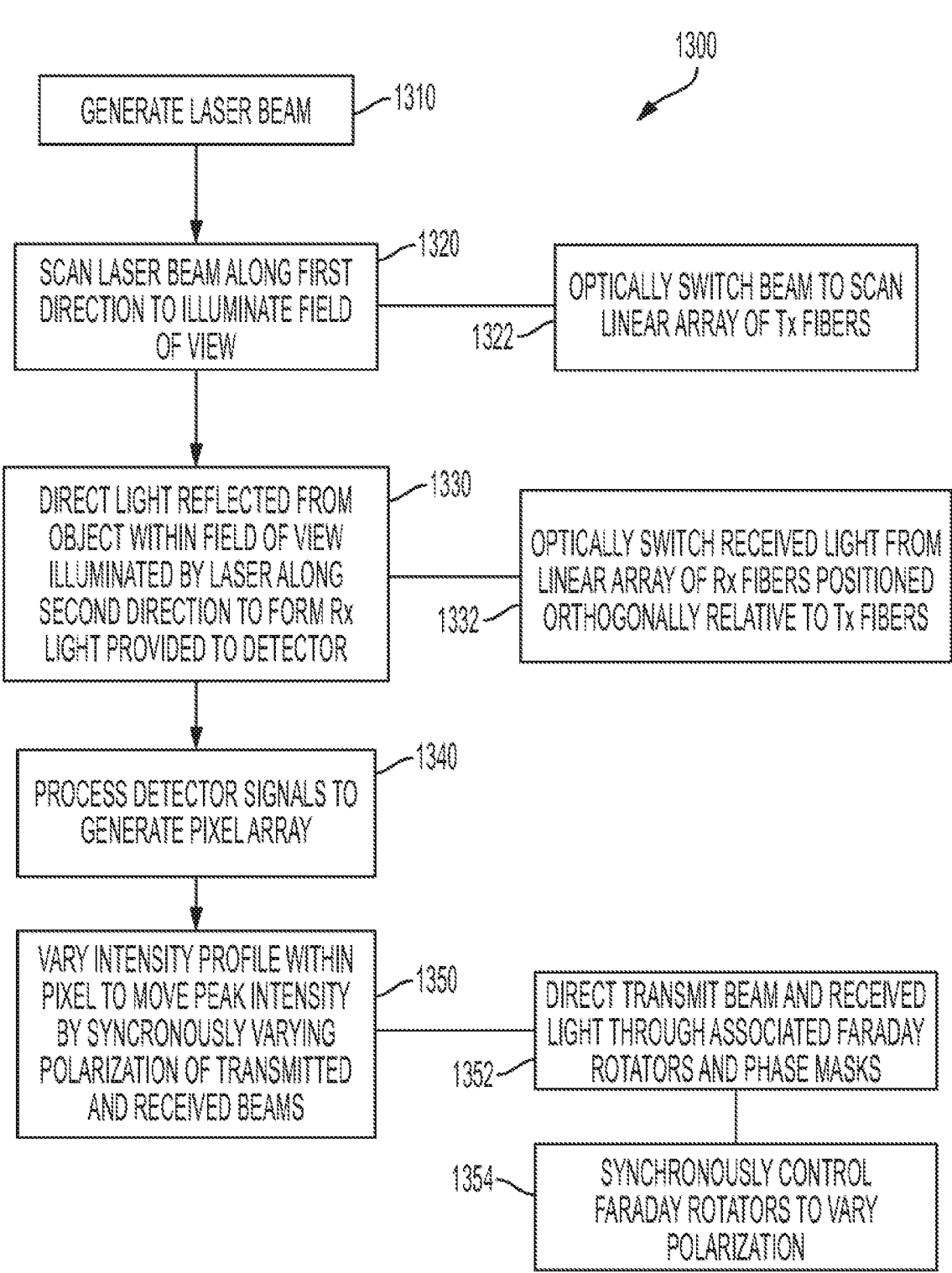
FIG. 13 is a flowchart illustrating operating of a system or method for increasing resolution of a laser scanned FOV using polarization manipulation according to one or more embodiments.

FIG. 13 is a flowchart illustrating operating of a system or method for increasing resolution of a laser scanned FOV using polarization manipulation according to one or more embodiments. System or method 1300 includes generating a laser beam at 1310, which may be a pulsed or continuous wave (cw) beam. The laser beam is scanned along a first direction to generate a transmitted beam to illuminate a field of view is indicated at 1320. This may include optically switching the laser beam to scan a first linear array of fibers as indicated at 1322.

The system or method 1300 may include directing light reflected from an object illuminated by the transmitted laser beam within the field of view along a second direction orthogonal to the first direction to form a received beam provided to at least one detector as represented at 1330. This may include optically switching received light from a linear array of fibers positioned orthogonally relative to the first linear array of fibers as indicated at 1332. Block 1340 represents processing signals from the at least one detector to generate a two-dimensional array of pixels. Block 1350 represents varying an intensity profile within a selected pixel or group of pixels to move peak intensity in a continuous manner within the selected pixel or across the group of pixels by synchronously varying polarization of the transmitted laser beam and the received beam provided to the at least one detector. This may include directing the transmitted beam and the received light through associated polarizers, Faraday rotators, and phase masks as represented at 1352, and synchronously controlling the Faraday rotators to manipulate or vary the polarization as represented at 1354.

While representative embodiments are described above, it is not intended that these embodiments describe all possible forms of the claimed subject matter. The words used in the specification are words of description rather than limitation, and it is understood that various changes may be made without departing from the spirit and scope of the disclosure and claimed subject matter. Additionally, the features of various implementing embodiments may be combined to form further embodiments not explicitly described or illustrated, but within the scope of the disclosure and claimed subject matter and recognizable to one of ordinary skill in the art.

While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A method comprising:

generating laser pulses;

optically switching the laser pulses to each of a first plurality of fibers arranged in a first linear array to illuminate a field of view;

shaping the laser pulses output from the first plurality of fibers to form pulsed beams having elliptical cross-sections with an angular divergence along a first axis at least 20 times greater than an angular divergence along a second axis perpendicular to the first axis;

directing light reflected from an object illuminated by the laser pulses within the field of view to a second plurality of fibers arranged in a second linear array, wherein the second linear array of fibers is positioned orthogonally to the first linear array of fibers;

optically switching light from the second plurality of fibers to direct the light to at least one detector; and processing signals from the detector to generate data representing the field of view, the data corresponding to pixels with each pixel corresponding to an intersection of the elliptically shaped cross sections of the transmitted and received pulsed beams.

2. The method of claim 1 wherein generating laser pulses comprises generating laser pulses using a fiber laser having an output wavelength of between 900 nm and 1700 nm.

3. The method of claim 1 wherein at least one of optically switching the laser pulses and optically switching the light from the second plurality of fibers comprises controlling a magneto-optical switch.

4. The method of claim 1 wherein the at least one detector is only one detector and wherein optically switching the light from the second plurality of fibers comprises optically switching the light to a single fiber coupled to the detector.

5. The method of claim 1 wherein the at least one detector includes a plurality of detectors and wherein optically switching the light from the second plurality of fibers comprises optically switching light from different groups of fibers to different detectors operating in parallel.

6. The method of claim 1 further comprising:

polarizing the laser pulses that illuminate the field of view;

detecting polarization of the light reflected from the object illuminated by the laser pulses; and generating polarization data representing the field of view based on detecting the polarization of the light reflected from the object.

7. The method of claim 6 further comprising varying polarization of the laser pulses to increase light intensity detected from a selected one of the second plurality of fibers relative to light intensity from fibers adjacent to the selected fiber.

8. A scanning lidar system comprising:

a transmitter including a laser and a first optical switch configured to receive laser pulses from the laser;

a first plurality of fibers each coupled to a different one of a plurality of outputs of the first optical switch, wherein outputs of the first plurality of fibers are positioned in a first linear array;

a first at least one optical element configured to receive the laser pulses from at least one of the first plurality of fibers and to redirect the laser pulses to illuminate at least a portion of a field of view, wherein the first at least one optical element comprises an aspherical lens configured to form an output beam having an elliptical cross section;

a receiver including a second optical switch and at least one detector;

a second plurality of fibers each coupled to a different input of the second optical switch, an output of the second optical switch coupled to the at least one detector, wherein outputs of the second plurality of fibers are positioned in a second linear array orthogonal to the first linear array;

a second at least one optical element configured to receive the laser pulses reflected from the field of view and to redirect received reflected pulses to at least one of the second plurality of fibers, wherein the second at least one optical element comprises collection optics positioned upstream of beam shaping optics, the beam shaping optics configured to form beams having an elliptical cross section; and at least one controller configured to control the first optical switch to direct the laser pulses from an input of the first optical switch to each of the plurality of outputs in turn, to control the second optical switch to direct light from each of the second plurality of fibers in turn to the output of the second optical switch, and to process signals from the at least one detector to generate data representing the field of view, wherein the data correspond to pixels with each pixel corresponding to an intersection of the elliptically shaped cross sections of the transmitted and received pulsed beams.

9. The system of claim 8 wherein the first optical switch and the second optical switch have no moving parts associated with switching light from the input to one of the plurality of outputs, or from the plurality of outputs to the input, respectively.

10. The system of claim 8 wherein at least one of the first and second optical switches comprises a Faraday rotator.

11. The system of claim 8 wherein at least one of the first and second optical switches comprises a magneto-optic switch.

12. The system of claim 8 wherein the at least one controller comprises a first microprocessor-based controller configured to control the first optical switch and a second microprocessor-based controller in communication with the first controller and configured to control the second optical switch.

13. The system of claim 8 wherein the laser comprises a fiber laser configured to generate pulses having a wavelength between 900 nanometers (nm) and 1700 nanometers (nm).

14. The system of claim 8 wherein the laser is configured to generate pulses having a nominal wavelength of 1550 nanometers (nm).

15. The system of claim 8 wherein the at least one first optical element is shaped to form an output beam having an angular divergence along a first axis of at least 20 times the angular divergence along a second axis perpendicular to the first axis.

16. The system of claim 8 wherein the at least one first optical element comprises a plurality of optical elements, each of the plurality of optical elements associated with one of the first plurality of fibers.

17. The system of claim 8 wherein the beams having an elliptical cross section have an angular divergence along a second axis at least 20 times the angular divergence along a first axis perpendicular to the second axis.

18. The system of claim 8 wherein the at least one detector comprises an avalanche photodiode.

19. The system of claim 8 wherein the at least one detector comprises a plurality of detectors configured to operate in parallel.

20. The system of claim 8 wherein the laser is configured to transmit polarized pulses and wherein the detector comprises a plurality of detectors each configured to detect received light having a different angle of polarization.

21. The system of claim 20 wherein the at least one controller processes signals from the plurality of detectors to generate degree of polarization or angle of polarization data representing the field of view.

22. The system of claim 20 wherein the first at least one optical element and the second at least one optical element each comprises a polarization rotator controlled by the at least one controller and a polarization phase mask.

23. The system of claim 20 wherein the first at least one optical element and the second at least one optical element each comprise a first linear polarizer, a Faraday rotator, a half-wave retarder phase mask, and a second linear polarizer.

24. The system of claim 8 wherein the at least one controller is further configured to operate the laser and the first and second optical switches to refresh the data at 100 Hz.

25. The system of claim 8 further comprising a housing containing the transmitter, the receiver, and the at least one controller and at least one optical head located outside of the housing and containing the first at least one optical element and the second at least one optical element, wherein the first plurality of fibers and the second plurality of fibers extends between the housing and the optical head.

26. The system of claim 25 wherein the housing contains a transmitter and a receiver associated with each of a plurality of remotely located optical heads each coupled by an associated fiber bundle.

27. A vehicle comprising a lidar system according to claim 1.

28. The vehicle of claim 27 further comprising an actuator configured to rotate at least one of the optical heads.

* * * * *